(12) United States Patent
Harada

(10) Patent No.: US 6,997,370 B2
(45) Date of Patent: Feb. 14, 2006

(54) OPTICAL PICKUP DEVICE

(75) Inventor: Suehiro Harada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 255 days.

(21) Appl. No.: 10/689,341

(22) Filed: Oct. 20, 2003

(65) Prior Publication Data

US 2004/0085653 A1    May 6, 2004

Related U.S. Application Data

(63) Continuation of application No. 09/845,927, filed on Apr. 30, 2001, now abandoned.

(30) Foreign Application Priority Data

May 16, 2000    (JP) .......................... 2000-003244 U

(51) Int. Cl.
*B23K 31/00*    (2006.01)
(52) U.S. Cl. .................... 228/179.1; 228/214; 228/102
(58) Field of Classification Search ...................... None
See application file for complete search history.

(56) References Cited

U.S. PATENT DOCUMENTS 3,532,967 A * 10/1970 Milton et al. ............... 324/424
4,683,422 A * 7/1987 Goodson ..................... 324/133
5,917,795 A * 6/1999 Furukawa et al. .......... 720/635
6,243,346 B1 * 6/2001 Furukawa et al. .......... 720/652

FOREIGN PATENT DOCUMENTS

JP    5-335689    * 12/1993
JP    9-231598    *  9/1997

OTHER PUBLICATIONS

Takekoshi, Taro, Translation to JP 5-335689, Dec. 1993, 4 pages.*

* cited by examiner

*Primary Examiner*—Jonathan Johnson

(74) *Attorney, Agent, or Firm*—Osha Liang LLP

(57) ABSTRACT

A method for assembling an optical disk apparatus involves disposing first and second short-cutting terminals at different faces of a housing and in parallel with a laser diode of the apparatus. In a first state of assembling, the first short-cutting terminal is shorted by a solder applied thereon. Thereafter, the apparatus is inspected in a second state of assembling in which the solder is removed from the first short-cutting terminal. After inspection, the second short-cutting terminal is shorted by a solder applied thereon. Subsequently, the solder on the second short-cutting terminal is removed.

10 Claims, 2 Drawing Sheets

OPTICAL PICKUP DEVICE

CROSS-REFERENCE TO RELATED APPLICATIONS

This application is a continuation of U.S. patent application Ser. No. 09/845,927, filed on Apr. 30, 2001, now abandoned, which claims priority from Japanese Patent Application No. 2000-003244, filed May 16, 2000.

BACKGROUND OF INVENTION

1. Field of the Invention

The present invention relates to an optical pickup device.

2. Background Art

In an optical pickup device in which a laser diode is mounted in a housing, a shortcut terminal for soldering is interposed between the terminals of the laser diode so as to prevent the electrostatic breakdown of the laser diode. FIG. 4 shows a circuit diagram of a laser diode 1 and a short-cut terminal 2 which are adopted in a conventional optical pickup device.

In the conventional optical pickup device having the circuit shown in FIG. 4, the electrostatic breakdown of the laser diode 1 is prevented by soldering the short-cut terminal 2 in advance for shortcircuiting.

With respect to the optical pickup device, not only is it necessary to keep the electrostatic breakdown of the laser diode prevented in its manufacturing line, but it is also necessary to keep the electrostatic breakdown of the laser diode prevented in the processing of mounting the optical pickup device in an apparatus to which the optical pickup device is set. For this purpose, when the laser diode is in an ungrounded state, the aforementioned short-cut terminal is conventionally shortcircuited by soldering both during the passage of the manufacturing line and after its mounting in the setting apparatus.

In addition, JP-A-5-335689 discloses an optical pickup device in which the terminals of a semiconductor laser are connected in advance in a shortcircuited state, and the shortcircuiting connection is broken when a voltage is applied to the semiconductor laser.

However, in the case where the short-cut terminal 2 shown in FIG. 4 is disposed on the side surface of the housing of the optical pickup device, although the operation of soldering and shortcircuiting the short-cut terminal 2 can be effected easily in the manufacturing line where the optical pickup devices are handled as single pieces, after the mounting of the optical pickup device in the setting apparatus, there has been a problem in that the other component parts on the setting apparatus side get in the way, and it is not easy to bring a soldering iron close to the short-cut terminal 2 disposed on the side surface of the housing, causing a decline in the operational efficiency at the time of soldering.

To cope with this problem, it is conceivable to dispose the short-cut terminal 2 on the rear surface of the housing of the optical pickup device. In this case, it is easy to solder and shortcircuit the short-cut terminal 2 after mounting the optical pickup device in the setting apparatus; however, in the manufacturing line where the optical pickup devices are handled as single pieces, there has arisen such a problem that, when the housing is reversed and the short-cut terminal on the rear surface is soldered, a lens unit attached by being merely inserted in a column on an obverse surface side of the housing becomes possibly dislocated from the column and comes off.

Furthermore, since only one short-cut terminal is conventionally provided, there has been a problem in that if the short-cut terminal burns, the optical pickup unit itself becomes unusable.

SUMMARY OF INVENTION

According to one aspect of one or more embodiments of the present invention, a method for assembling an optical disk apparatus comprises the steps of: assembling an optical pickup device having a housing, a laser diode mounted in the housing, an objective lens disposed at one face of the housing, and first and second short-cutting terminals disposed at different faces of the housing and in parallel between terminals of the laser diode, where in a first state of assembling, the first short-cutting terminal is shorted by a solder; inspecting the optical pickup device in a second state of assembling in which the solder is removed from the first short-cutting terminal; after inspecting, short-cutting the second short-cutting terminal by applying a solder thereon; mounting the inspected optical pickup device into a setting apparatus; and removing the solder applied on the second short-cutting terminal.

According to one aspect of one or more embodiments of the present invention, a method for manufacturing an optical pickup device comprises: disposing a first short-cutting terminal on a side of a housing of the optical pickup device; disposing a second short-cutting terminal on a different side of the housing, where the first short-cutting terminal and the second short-cutting terminal are disposed in parallel and in between terminals of a laser diode of the optical pickup device; selectively applying a solder to the first short-cutting terminal during a first stage of the manufacturing; removing the solder from the first short-cutting terminal during a second stage of the manufacturing; selectively applying a solder to the second short-cutting terminal; mounting the optical pickup device in a setting apparatus; and removing the solder from the second short-cutting terminal.

Other aspects and advantages of the invention will be apparent from the following description and the appended claims.

DETAILED DESCRIPTION

Now, a description will be given in more detail of an embodiment of the invention with reference to the accompanying drawings.

Figure 1:
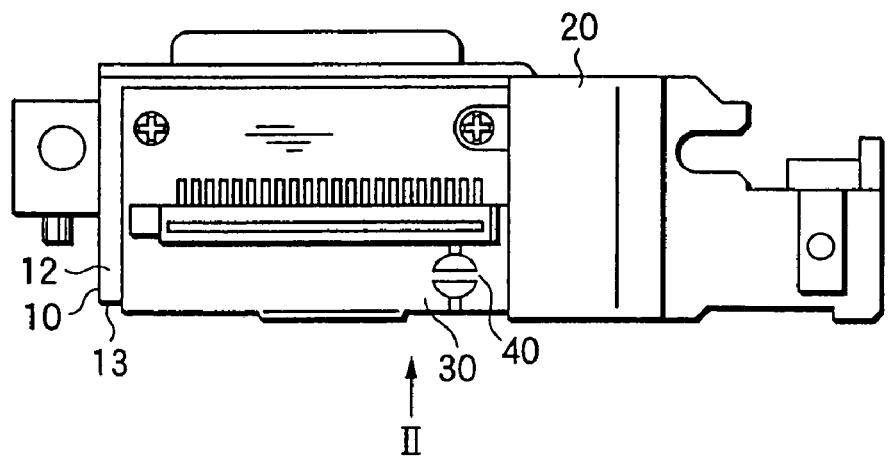
FIG. 1 is a side view of an optical pickup device in accordance with an embodiment of the invention.
Figure 2:
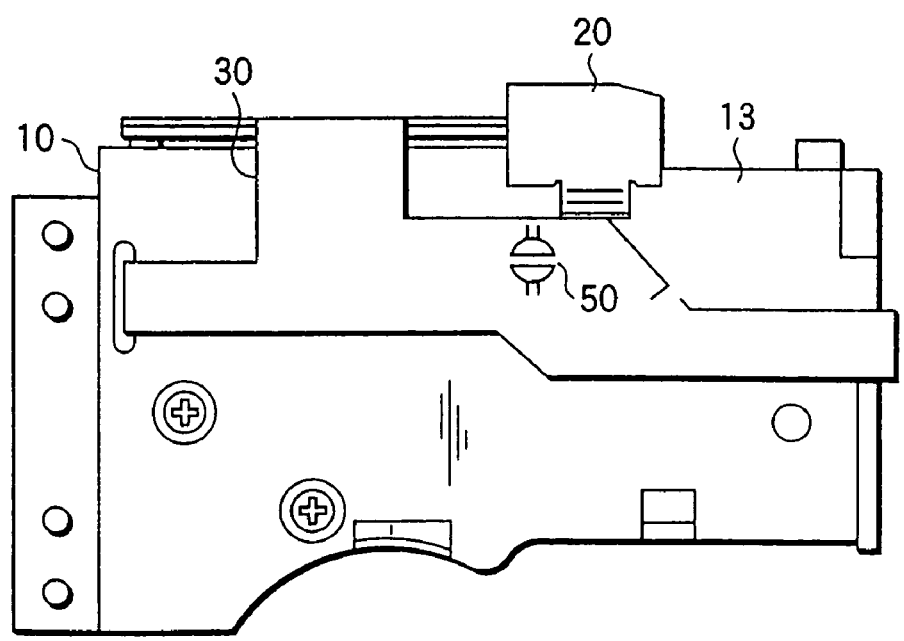
FIG. 2 is a view taken in the direction of arrow II in FIG. 1.

FIG. 1 is a side view of an optical pickup device, and FIG. 2 is a view taken in the direction of arrow II in FIG. 1. In these drawings, reference numeral 10 denotes a housing; 20, a shield cover surrounding a photodiode mounted in the housing 10; and 30, a flexible wiring board. In this optical pickup device, a first short-cutting terminal 40 for soldering is disposed on a side surface 12 of the housing 10 as shown in FIG. 1, while a second short-cutting terminal 50 for soldering is disposed on a rear surface 13 of the housing 10 as shown in FIG. 2.

Figure 3:
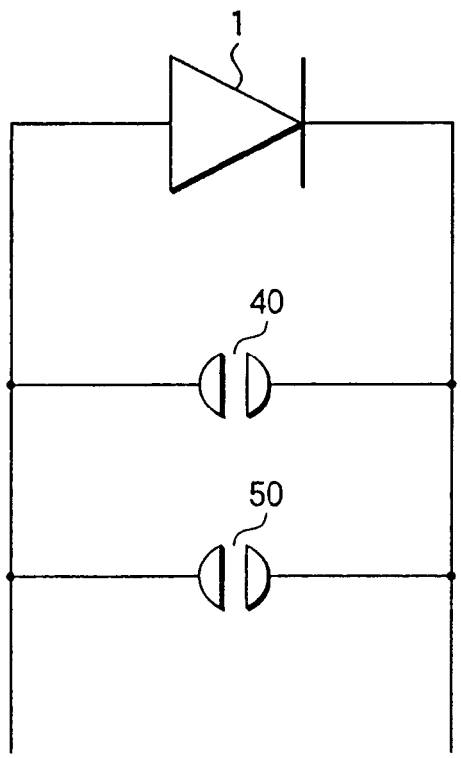
FIG. 3 is a circuit diagram of a laser diode and two short-cut terminals which are adopted in the optical pickup device in accordance with the embodiment.
Figure 4:
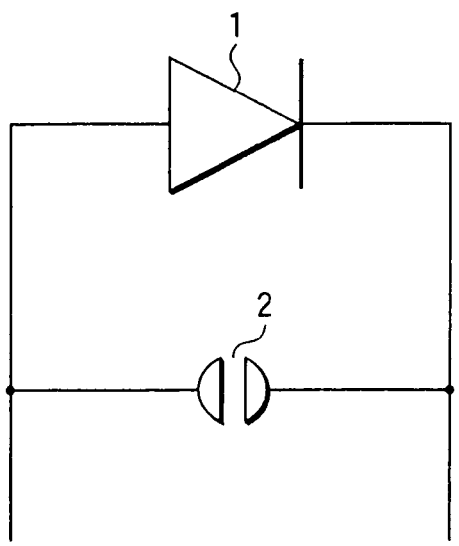
FIG. 4 is a circuit diagram of a laser diode and a short-cut terminal which are adopted in a conventional optical pickup device.

FIG. 3 shows a circuit diagram of a laser diode 1 and the first and second two short-cutting terminals 40 and 50 which are adopted in the optical pickup device in accordance with this embodiment. As shown in the drawing, the first and second two short-cutting terminals 40 and 50 are interposed in parallel between the terminals of the laser diode 1. In the optical pickup device having the circuit shown in FIG. 3, the electrostatic breakdown of the laser diode 1 is prevented by soldering and shortcircuiting in advance one of the first and second short-cutting terminals 40 and 50.

Accordingly, in case where the first short-cutting terminal 40 has burned, the electrostatic breakdown of the laser diode 1 can be prevented by soldering and shortcircuiting the second short-cutting terminal 50. On the other hand, in case where the second short-cutting terminal 50 has burned, the electrostatic breakdown of the laser diode 1 can be prevented by soldering and shortcircuiting the first short-cutting terminal 40.

In addition, in a manufacturing line where the optical pickup devices are assembled and handled as single pieces, the electrostatic breakdown of the laser diode is prevented by soldering and shortcircuiting the first short-cutting terminal 40 which is disposed on the side surface 12 of the housing 10 and which can be easily soldered. Thereafter, the optical pickup device may be inspected after removal of the solder from the first short-cutting terminal 40. After the optical pickup device is mounted in a setting apparatus, the electrostatic breakdown of the laser diode can be prevented by soldering and shortcircuiting the second short-cutting terminal 50 disposed on the rear surface 13 of the housing 10 where the soldering work is not hampered by other component parts on the setting apparatus side. It should be noted that after the optical pickup device is mounted in the setting apparatus, since a cover and the like on the setting apparatus side are disposed on the lens unit described at the beginning, even if the housing 10 is reversed together with the setting apparatus, a situation does not occur in which the lens unit becomes dislocated and comes off the column described at the beginning.

It should be noted that in the manufacturing line of the optical pickup device and in the stage after the incorporation of the optical pickup device into the setting apparatus, when the laser diode 1 is grounded, since it is unnecessary to keep both first and second short-cutting terminals 40 and 50 short-circuited, the solder is removed at that time to keep the laser diode 1 in an insulated state.

Advantages of the present invention may be one or more of the following. In one or more embodiments, because an optical pickup device has first and second short-cutting terminals disposed in parallel between terminals of a laser diode mounted in a housing of the optical pickup device, the optical pickup device may be capable of overcoming the problem concerning the burning of the short-cut terminal, the problem concerning the operational efficiency at the time of soldering, and the problem concerning the coming off of the laser unit.

In one or more embodiments, in the case when one short-cutting terminal of an optical pickup device has burned out, the electrostatic breakdown of a laser diode in the optical pickup device may be prevented by shorting another short-cutting terminal with a solder.

In addition, in one or more embodiments of the present invention, of the two short-cutting terminals, it may be possible to effect soldering by selecting one which can be easily soldered, and effect soldering by selecting one which can be soldered without reversing an orientation of a housing of the optical pickup device. Therefore, it may become possible to readily perform the soldering operation of the short-cutting terminals in the manufacturing line and in the stage after the mounting of the optical pickup device in a setting apparatus.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assembling an optical disk apparatus comprising the steps of:
    assembling an optical pickup device comprising:
        a housing,
        a laser diode mounted in the housing,
        an objective lens disposed at one face of the housing, and
        first and second short-cutting terminals disposed at different faces of the housing and in parallel between terminals of the laser diode, wherein in a first state of assembling, the first short-cutting terminal is shorted by a solder;
    inspecting the optical pickup device in a second state of assembling in which the solder is removed from the first short-cutting terminal;
    after inspecting, short-cutting the second short-cutting terminal by applying a solder thereon;
    mounting the inspected optical pickup device into a setting apparatus; and
    removing the solder applied on the second short-cutting terminal.

2. The method of claim 1, wherein assembling the optical pickup device comprises:
    disposing the second short-cutting terminal at a face opposite to a face where the objective lens is disposed, and
    disposing the first short-cutting terminal at a face different from the face where the objective lens and the second short-cutting terminal are disposed.

3. The method of claim 1, wherein the first short-cutting terminal is disposed on a side surface of the housing, and wherein the second short-cutting terminal is disposed on a rear surface of the housing.

4. The method of claim 1, wherein an optical pickup and the laser diode are disposed within the housing.

5. The method of claim 1, wherein the housing is rectangular.

6. The method of claim 1, the optical pickup device further comprising:
    a flexible wiring substrate disposed along a side surface and a rear surface of said housing, wherein the first and second short-cutting terminals are disposed on the flexible wiring substrate.

7. The method of claim 1, wherein the first and second short-cutting terminals each comprise a semiconductor solder land that face each other.

8. The method of claim 1, wherein the first short-cutting terminal is disposed on a side surface of the housing located at a position proximate a rear surface of the housing.

9. A method for manufacturing an optical pickup device, comprising:

disposing a first short-cutting terminal on a side of a housing of the optical pickup device;

disposing a second short-cutting terminal on a different side of the housing, wherein the first short-cutting terminal and the second short-cutting terminal are disposed in parallel and in between terminals of a laser diode of the optical pickup device;

selectively applying a solder to the first short-cutting terminal during a first stage of the manufacturing;

removing the solder from the first short-cutting terminal during a second stage of the manufacturing;

selectively applying a solder to the second short-cutting terminal;

mounting the optical pickup device in a setting apparatus; and removing the solder from the second short-cutting terminal.

10. The method of claim 9, wherein the first short-cutting terminal is disposed on a side surface of the housing, and wherein the second short-cutting terminal is disposed on a rear surface of the housing.

* * * * *